(12) United States Patent
Li et al.

(10) Patent No.: US 10,386,476 B2
(45) Date of Patent: Aug. 20, 2019

(54) OBSTACLE DETECTION METHOD AND APPARATUS FOR VEHICLE-MOUNTED RADAR SYSTEM

(71) Applicant: BAIDU ONLINE NETWORK TECHNOLOGY (BEIJING) CO., LTD., Beijing (CN)

(72) Inventors: Bo Li, Beijing (CN); Rui Shao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 330 days.

(21) Appl. No.: 15/393,660

(22) Filed: Dec. 29, 2016

(65) Prior Publication Data

US 2018/0088228 A1 Mar. 29, 2018

(30) Foreign Application Priority Data

Sep. 23, 2016 (CN) .......................... 2016 1 0847048

(51) Int. Cl.
| | |
|---|---|
| *G01S 7/497* | (2006.01) |
| *G01S 13/86* | (2006.01) |
| *G01S 7/40* | (2006.01) |
| *G01S 13/93* | (2006.01) |
| *G01S 17/93* | (2006.01) |

(52) U.S. Cl.
CPC .......... *G01S 13/865* (2013.01); *G01S 7/4004* (2013.01); *G01S 7/4026* (2013.01); *G01S 7/497* (2013.01); *G01S 7/4972* (2013.01); *G01S 13/931* (2013.01); *G01S 17/936* (2013.01)

(58) Field of Classification Search
CPC .... G01S 13/865; G01S 13/931; G01S 17/936; G01S 7/4004; G01S 7/497; G01S 7/4026; G01S 7/4972
USPC ......................................................... 342/54
See application file for complete search history.

(56) References Cited

U.S. PATENT DOCUMENTS

| | | | | |
|---|---|---|---|---|
| 2004/0246171 | A1* | 12/2004 | Orr .......................... | G01S 7/022 342/174 |
| 2006/0125679 | A1* | 6/2006 | Horibe .................. | G01S 17/023 342/52 |
| 2017/0299404 | A1* | 10/2017 | Wang ........................ | G06T 7/80 |

* cited by examiner

*Primary Examiner* — Timothy X Pham
(74) *Attorney, Agent, or Firm* — Lathrop Gage LLP

(57) ABSTRACT

An obstacle detection method and apparatus for a vehicle-mounted radar system. The method includes: detecting a first point cloud data set of calibration objects located at a plurality of preset positions and detecting a first two-dimensional data set of the calibration objects; calibrating a vehicle-mounted radar system based on preset mounting positions, the first point cloud data set, and the first two-dimensional data set, to obtain a calibrated turning angle difference, a calibrated displacement difference, and a calibrated vertical coordinate; detecting a second point cloud data set of an obstacle and detecting a second two-dimensional data set of the obstacle; converting the second two-dimensional data set into a laser radar coordinate system based on the calibrated turning angle difference, the calibrated displacement difference, and the calibrated vertical coordinate, to obtain converted two-dimensional coordinates; and integrating the second point cloud data set and the converted two-dimensional coordinates to determine a position of the obstacle.

18 Claims, 6 Drawing Sheets

OBSTACLE DETECTION METHOD AND APPARATUS FOR VEHICLE-MOUNTED RADAR SYSTEM

CROSS-REFERENCE TO RELATED APPLICATION

This application claims the priority of Chinese Patent Application No. 201610847048.5, entitled "Obstacle Detection Method And Apparatus For Vehicle-Mounted Radar System," filed on Sep. 23, 2016, the content of which is incorporated herein by reference in its entirety.

TECHNICAL FIELD

The present disclosure relates to the field of vehicle control, specifically to the field of vehicle detection, and more specifically to an obstacle detection method and apparatus for a vehicle-mounted radar system.

BACKGROUND

Millimeter-wave radars and laser radars are widely used in such fields as autonomous driving and advanced driver assistant system (ADAS). The laser radar can accurately sense the shape of an obstacle. The millimeter-wave radar can provide effective sensing data regarding the position and speed of the obstacle, and is not affected by rain and snow. In many examples of autonomous driving and ADAS, the position and attitude of the two types of sensors need to be calibrated to integrate data, so as to implement the accurate and robust detection of obstacles.

A calibration algorithm is used for calculating the conversion of coordinates between the millimeter-wave radar data coordinate system and the laser radar data coordinate system. Since the laser radar performs 3D obstacle measurement and the millimeter-wave radar performs 2D obstacle measurement, existing calibration methods cannot well solve the missing dimension of the millimeter-wave radar in terms of 3D measurement, affecting the accuracy of the calibration result. As a result, the laser radar and the millimeter-wave radar cannot be effectively used to implement the accurate detection of the positions of obstacles around a vehicle.

SUMMARY

An objective of the present disclosure is to provide an obstacle detection method and apparatus for a vehicle-mounted radar system, so as to solve the technical problems mentioned in the Background section.

According to a first aspect, the present disclosure provides an obstacle detection method for a vehicle-mounted radar system, wherein the vehicle-mounted radar system comprises a laser radar and a millimeter-wave radar located at preset mounting positions, the method comprising: detecting a first point cloud data set of calibration objects located at a plurality of preset positions by using the laser radar and detecting a first two-dimensional data set of the calibration objects by using the millimeter-wave radar; calibrating the vehicle-mounted radar system based on the preset mounting positions, the first point cloud data set, and the first two-dimensional data set, to obtain a calibrated turning angle difference, a calibrated displacement difference, and a calibrated vertical coordinate that are converted from a millimeter-wave radar coordinate system to a laser radar coordinate system; detecting a second point cloud data set of an obstacle by using the laser radar and detecting a second two-dimensional data set of the obstacle by using the millimeter-wave radar; converting the second two-dimensional data set into the laser radar coordinate system based on the calibrated turning angle difference, the calibrated displacement difference, and the calibrated vertical coordinate, to obtain first converted two-dimensional coordinates; and integrating the second point cloud data set and the first converted two-dimensional coordinates to determine a position of the obstacle.

In some embodiments, the calibrating the vehicle-mounted radar system based on the preset mounting positions, the first point cloud data set, and the first two-dimensional data set comprises: determining, based on the preset mounting positions, a height difference between the laser radar and the millimeter-wave radar and an initial turning angle difference and an initial displacement difference that are converted from the millimeter-wave radar coordinate system to the laser radar coordinate system; fitting first point cloud data belonging to a given position in the first point cloud data set, determining projection coordinates of a fitted straight line in an xy plane of the laser radar coordinate system, and obtaining a projection coordinate sequence corresponding to the plurality of preset positions; determining a second converted two-dimensional coordinate set from the millimeter-wave radar coordinate system to the laser radar coordinate system based on the initial turning angle difference, the initial displacement difference, the height difference, and the projection coordinate set; and optimizing a deviation between the first two-dimensional data set and the second converted two-dimensional coordinate set by using an optimization algorithm, obtaining, based on the optimized deviation, a corresponding calibrated turning angle difference, a corresponding calibrated displacement difference, and a corresponding calibrated vertical coordinate converted from the millimeter-wave radar coordinate system to the laser radar coordinate system, and implementing the calibration of the vehicle-mounted radar system.

In some embodiments, the determining, based on the preset mounting positions, a height difference between the laser radar and the millimeter-wave radar and an initial turning angle difference and an initial displacement difference that are converted from the millimeter-wave radar coordinate system to the laser radar coordinate system comprises: determining three-dimensional coordinates of the preset mounting positions in the vehicle coordinate system; determining a difference between vertical coordinates in the three-dimensional coordinates as the height difference between the laser radar and the millimeter-wave radar; determining the initial turning angle difference based on an angle between a coordinate axis of the laser radar coordinate system and a coordinate axis of the millimeter-wave radar coordinate system; and determining the initial displacement difference based on distances between coordinate axes of the laser radar coordinate system and the millimeter-wave radar coordinate system.

In some embodiments, the fitting first point cloud data belonging to a given position in the first point cloud data set, determining projection coordinates of a fitted straight line in an xy plane of the laser radar coordinate system, and obtaining a projection coordinate sequence corresponding to the plurality of preset positions comprises: fitting, in the laser radar coordinate system, the first point cloud data belonging to the given position in the first point cloud data set to a vertical straight line; determining projection coordinates of the fitted straight line belonging to the given position on the xy plane; and combining projection coordinates of the plurality of preset positions, to obtain the projection coordinate sequence.

In some embodiments, the determining a second converted two-dimensional coordinate set from the millimeter-wave radar coordinate system to the laser radar coordinate system based on the initial turning angle difference, the initial displacement difference, the height difference, and the projection coordinate set comprises: using a horizontal coordinate of each of the projection coordinates in the projection coordinate set as a transition horizontal coordinate in a transition coordinate set; using a longitudinal coordinate of each of the projection coordinates in the projection coordinate set as a transition longitudinal coordinate in the transition coordinate set; using the height difference as a transition vertical coordinate in the transition coordinate set; and determining the second converted two-dimensional coordinate set from the millimeter-wave radar coordinate system to the laser radar coordinate system according to the following formula:

$$(x_{2i}, y_{2i}, z_2)^T = R \times (x_{1i}, y_{1i}, z_1)^T + t,$$

wherein $x_{2i}$ is the horizontal coordinate of the second converted two-dimensional coordinates at the $i^{th}$ position in the second converted two-dimensional coordinate set, $y_{2i}$ is the longitudinal coordinate of the second converted two-dimensional coordinates at the $i^{th}$ position in the second converted two-dimensional coordinate set, $z_2$ is the vertical coordinate of the second converted two-dimensional coordinates, $(x_{2i}, y_{2i}, z_2)$ is the second converted two-dimensional coordinates at the $i^{th}$ position, $(x_{2i}, y_{2i}, z_2)^T$ is a transpose of the second converted two-dimensional coordinates at the $i^{th}$ position, R is the initial turning angle difference, $x_{1i}$ is the transition horizontal coordinate at the $i^{th}$ position, $y_{1i}$ is the transition longitudinal coordinate at the $i^{th}$ position, $z_1$ is the transition vertical coordinate, $(x_{1i}, y_{1i}, z_1)$ is the transition coordinates at the $i^{th}$ position, $(x_{1i}, y_{1i}, z_1)^T$ is a transpose of the transition coordinates at the $i^{th}$ position, and t is the initial displacement difference.

In some embodiments, the optimizing a deviation between the first two-dimensional data set and the second converted two-dimensional coordinate set by using an optimization algorithm comprises: determining the deviation between the first two-dimensional data set and the second converted two-dimensional coordinate set according to the following formula:

$$\sigma^2 = \sum_{i=1}^{n} [(x_{ri}^2 - x_{2i}^2) + (y_{ri}^2 - y_{2i}^2) + z_2^2],$$

wherein $\sigma^2$ is the deviation, i is a natural number, n is the number of the plurality of preset positions, $x_{ri}$ is a horizontal coordinate of first two-dimensional coordinates at the $i^{th}$ position that are detected by the millimeter-wave radar, $y_{ri}$ is a longitudinal coordinate of the first two-dimensional coordinates at the $i^{th}$ position that are detected by the millimeter-wave radar, $x_{2i}$ is the horizontal coordinate of the second converted two-dimensional coordinates at the $i^{th}$ position in the second converted two-dimensional coordinate set, $y_{2i}$ is the longitudinal coordinate of the second converted two-dimensional coordinates at the $i^{th}$ position in the second converted two-dimensional coordinate set, and $z_2$ is the vertical coordinate of the second converted two-dimensional coordinates; and optimizing the deviation by using the optimization algorithm, and determining the calibrated turning angle difference, the calibrated displacement difference, and the calibrated vertical coordinate.

According to a second aspect, the present disclosure provides an obstacle detection apparatus for a vehicle-mounted radar system, wherein the vehicle-mounted radar system comprises a laser radar and a millimeter-wave radar located at preset mounting positions, the apparatus comprising: a first detection unit for detecting a first point cloud data set of calibration objects located at a plurality of preset positions by using the laser radar and detecting a first two-dimensional data set of the calibration objects by using the millimeter-wave radar; a calibration unit for calibrating the vehicle-mounted radar system based on the preset mounting positions, the first point cloud data set, and the first two-dimensional data set, to obtain a calibrated turning angle difference, a calibrated displacement difference, and a calibrated vertical coordinate that are converted from a millimeter-wave radar coordinate system to a laser radar coordinate system; a second detection unit for detecting a second point cloud data set of an obstacle by using the laser radar and detecting a second two-dimensional data set of the obstacle by using the millimeter-wave radar; a conversion unit for converting the second two-dimensional data set into the laser radar coordinate system based on the calibrated turning angle difference, the calibrated displacement difference, and the calibrated vertical coordinate, to obtain first converted two-dimensional coordinates; and an integration unit for integrating the second point cloud data set and the first converted two-dimensional coordinates to determine a position of the obstacle.

In some embodiments, the calibration unit comprises: a first determining module for determining, based on the preset mounting positions, a height difference between the laser radar and the millimeter-wave radar and an initial turning angle difference and an initial displacement difference that are converted from the millimeter-wave radar coordinate system to the laser radar coordinate system; a projection module for fitting first point cloud data belonging to a given position in the first point cloud data set, determining projection coordinates of a fitted straight line in an xy plane of the laser radar coordinate system, and obtaining a projection coordinate sequence corresponding to the plurality of preset positions; a second determining module for determining a second converted two-dimensional coordinate set from the millimeter-wave radar coordinate system to the laser radar coordinate system based on the initial turning angle difference, the initial displacement difference, the height difference, and the projection coordinate set; and a calibration module for optimizing a deviation between the first two-dimensional data set and the second converted two-dimensional coordinate set by using an optimization algorithm, obtaining, based on the optimized deviation, a corresponding calibrated turning angle difference, a corresponding calibrated displacement difference, and a corresponding calibrated vertical coordinate converted from the millimeter-wave radar coordinate system to the laser radar coordinate system, and implementing the calibration of the vehicle-mounted radar system.

In some embodiments, the first determining module comprises: a three-dimensional coordinates determining submodule for determining three-dimensional coordinates of the preset mounting positions in the vehicle coordinate system; a height difference determining submodule for determining a difference between vertical coordinates in the three-dimensional coordinates as the height difference between the laser radar and the millimeter-wave radar; an initial turning angle difference determining submodule for determining the initial turning angle difference based on an angle between a coordinate axis of the laser radar coordinate system and a coordinate axis of the millimeter-wave radar coordinate system; and an initial displacement difference determining submodule for determining the initial displacement difference based on distances between coordinate axes of the laser radar coordinate system and the millimeter-wave radar coordinate system.

In some embodiments, the projection module comprises: a fitting submodule for fitting, in the laser radar coordinate system, the first point cloud data belonging to the given position in the first point cloud data set to a vertical straight line; a projection submodule for determining projection coordinates of the fitted straight line belonging to the given position on the xy plane; and a combining submodule for combining projection coordinates of the plurality of preset positions, to obtain the projection coordinate sequence.

In some embodiments, the second determining module comprises: a transition horizontal coordinate determining submodule for using a horizontal coordinate of each of the projection coordinates in the projection coordinate set as a transition horizontal coordinate in a transition coordinate set; a transition longitudinal coordinate determining submodule for using a longitudinal coordinate of each of the projection coordinates in the projection coordinate set as a transition longitudinal coordinate in the transition coordinate set; a transition vertical coordinate determining submodule for using the height difference as a transition vertical coordinate in the transition coordinate set; and a converted two-dimensional coordinates determining submodule for determining the second converted two-dimensional coordinate set from the millimeter-wave radar coordinate system to the laser radar coordinate system according to the following formula:

$$(x_{2i}, y_{2i}, z_2)^T = R \times (x_{1i}, y_{1i}, z_1)^T + t,$$

wherein $x_{2i}$ is the horizontal coordinate of the second converted two-dimensional coordinates at the $i^{th}$ position in the second converted two-dimensional coordinate set, $y_{2i}$ is the longitudinal coordinate of the second converted two-dimensional coordinates at the $i^{th}$ position in the second converted two-dimensional coordinate set, $z_2$ is the vertical coordinate of the second converted two-dimensional coordinates, $(x_{2i}, y_{2i}, z_2)$ is the second converted two-dimensional coordinates at the $i^{th}$ position, $(x_{2i}, y_{2i}, z_2)^T$ is a transpose of the second converted two-dimensional coordinates at the $i^{th}$ position, R is the initial turning angle difference, $x_{1i}$ is the transition horizontal coordinate at the $i^{th}$ position, $y_{1i}$ is the transition longitudinal coordinate at the $i^{th}$ position, $z_1$ is the transition vertical coordinate, $(x_{1i}, y_{1i}, z_1)$ is the transition coordinates at the $i^{th}$ position, $(x_{1i}, y_{1i}, z_1)^T$ is a transpose of the transition coordinates at the $i^{th}$ position, and t is the initial displacement difference.

In some embodiments, the calibration module comprises: a deviation determining submodule for determining the deviation between the first two-dimensional data set and the second converted two-dimensional coordinate set according to the following formula:

$$\sigma^2 = \sum_{i=1}^{n} [(x_{ri}^2 - x_{2i}^2) + (y_{ri}^2 - y_{2i}^2) + z_2^2],$$

wherein $\sigma^2$ is the deviation, i is a natural number, n is the number of the plurality of preset positions, $x_{ri}$ is a horizontal coordinate of first two-dimensional coordinates at the $i^{th}$ position that are detected by the millimeter-wave radar, $y_{ri}$ is a longitudinal coordinate of the first two-dimensional coordinates at the $i^{th}$ position that are detected by the millimeter-wave radar, $x_{2i}$ is the horizontal coordinate of the second converted two-dimensional coordinates at the $i^{th}$ position in the second converted two-dimensional coordinate set, $y_{2i}$ is the longitudinal coordinate of the second converted two-dimensional coordinates at the $i^{th}$ position in the second converted two-dimensional coordinate set, and $z_2$ is the vertical coordinate of the second converted two-dimensional coordinates; and an optimization submodule for optimizing the deviation by using the optimization algorithm, and determining the calibrated turning angle difference, the calibrated displacement difference, and the calibrated vertical coordinate.

According to the obstacle detection method and apparatus for a vehicle-mounted radar system that are provided by the present disclosure, first, data of calibration objects at different positions is collected by using a millimeter-wave radar and a laser radar; the laser radar and the millimeter-wave radar are calibrated by using the data, to determine a turning angle difference, a displacement difference, a vertical coordinate converted from a millimeter-wave radar coordinate system to a laser radar coordinate system, which are required for calibration; two-dimensional data of an obstacle that is detected by the millimeter-wave radar is converted into the laser radar coordinate system based on the above-mentioned parameters, to obtain converted two-dimensional coordinates; finally, the converted two-dimensional coordinates and point cloud data of the obstacle that is detected by the laser radar are integrated, so as to accurately determine a position of the obstacle. Whereby, the method and apparatus can effectively implement accurate obstacle detection by using a laser radar and a millimeter-wave radar.

BRIEF DESCRIPTION OF THE DRAWINGS

Other features, purposes and advantages of the present disclosure will become more apparent from a reading of the detailed description of the non-limiting embodiments, said description being given in relation to the accompanying drawings, among which.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
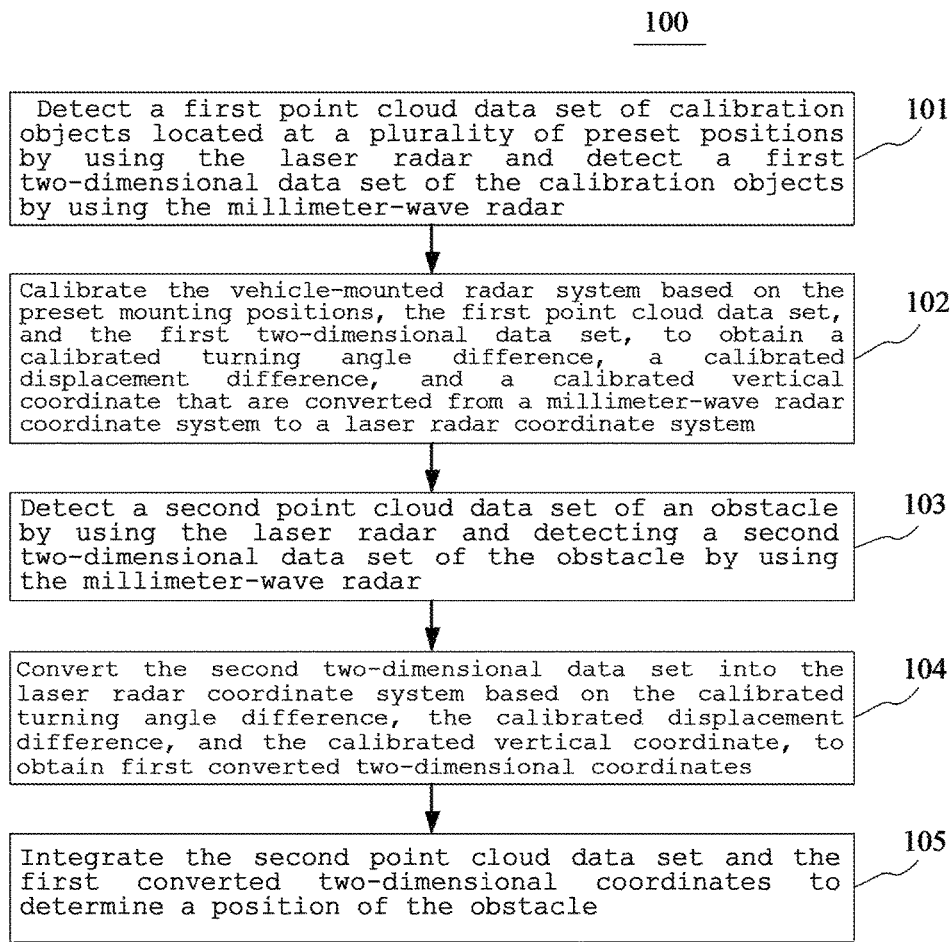
FIG. 1 is a flowchart of an obstacle detection method for a vehicle-mounted radar system according to an embodiment of the present disclosure.

FIG. 1 shows a flow 100 of an obstacle detection method for a vehicle-mounted radar system according to an embodiment of the present disclosure. In this embodiment, the vehicle-mounted radar system includes a laser radar and a millimeter-wave radar located at preset mounting positions. The laser radar may be mounted at a position on the top of a vehicle, and the millimeter-wave radar may be mounted at another position that is at a different height from the laser radar.

As shown in FIG. 1, the obstacle detection method for a vehicle-mounted radar system according to this embodiment includes the following steps:

Step 101. Detect a first point cloud data set of calibration objects located at a plurality of preset positions by using the laser radar and detect a first two-dimensional data set of the calibration objects by using the millimeter-wave radar.

In this embodiment, a driving brain of the vehicle or a server connected to the vehicle can control the laser radar in the vehicle-mounted radar system to detect calibration objects located at a plurality of different preset positions. The calibration object may be any object or person of a shape. The above-mentioned object may be, for example, a cylinder, a cone, or any other object having a particular height. The laser radar may be a radar system operating in spectral range from infrared to ultraviolet, and can operate in a pulsed or continuous wave mode. Detection methods may include Mie scattering, Rayleigh scattering, Raman scattering, Brillouin scattering, fluorescence, Doppler, and so on depending on different detection principles. The millimeter-wave radar has an operating frequency in the range of 30 GHz to 300 GHz, and may be a frequency modulated continuous wave (FMCW) radar or a pulse radar. When data of the calibration objects is collected, the calibration objects are placed at different positions within a common vision of the laser radar and the millimeter-wave radar, and the laser radar and the millimeter-wave radar are controlled to respectively collect first point cloud data and first two-dimensional data of the calibration objects.

Exemplarily, cylinders may be used as the calibration objects, and 20 positions are selected within the common vision of the laser radar and the millimeter-wave radar. In this case, the laser radar collects a total of 20 pieces of point cloud data, and the millimeter-wave radar collects a total of 20 pieces of two-dimensional data, thus respectively obtaining a first point cloud data set and a first two-dimensional data set.

Step 102. Calibrate the vehicle-mounted radar system based on the preset mounting positions, the first point cloud data set, and the first two-dimensional data set, to obtain a calibrated turning angle difference, a calibrated displacement difference, and a calibrated vertical coordinate that are converted from a millimeter-wave radar coordinate system to a laser radar coordinate system.

In this embodiment, to calibrate the above-mentioned vehicle-mounted radar system by means of conversion from the millimeter-wave radar coordinate system to the laser radar coordinate system, a calibrated turning angle difference R and a calibrated displacement difference t required for coordinate system conversion need to be determined. In addition, because the data detected by the millimeter-wave radar is two-dimensional data without the longitudinal coordinate, a calibrated coordinate needs to be added for each two-dimensional data during conversion, thereby implementing the conversion from two-dimensional coordinates to three-dimensional coordinates. The above-mentioned calibrated turning angle difference R and the above-mentioned calibrated displacement difference t may be determined by the mounting positions and attitudes of the laser radar and the millimeter-wave radar on the vehicle. The above-mentioned the calibrated coordinate needs to be determined based on the calibrated turning angle difference R, the calibrated displacement difference t, the first point cloud data detected by the laser radar, and the first two-dimensional data detected by the millimeter-wave radar.

Step 103. Detect a second point cloud data set of an obstacle by using the laser radar and detecting a second two-dimensional data set of the obstacle by using the millimeter-wave radar.

After the laser radar and the millimeter-wave radar in the vehicle-mounted radar system are calibrated, the above-mentioned vehicle-mounted radar system needs to be used to detect an obstacle around the vehicle. During obstacle detection, a second point cloud data set of the obstacle is detected by using the laser radar, and a second two-dimensional data set of the obstacle is detected by using the millimeter-wave radar. The above-mentioned obstacle may be any object or pedestrian around the vehicle that hinders the driving of the vehicle. The above-mentioned object may be a roadblock, a tree, and so on.

Step 104. Convert the second two-dimensional data set into the laser radar coordinate system based on the calibrated turning angle difference, the calibrated displacement difference, and the calibrated vertical coordinate, to obtain first converted two-dimensional coordinates.

Because the calibrated turning angle difference, the calibrated displacement difference, and the calibrated vertical coordinate converted from the millimeter-wave radar coordinate system to the laser radar coordinate system are determined in step 102, when the position of the obstacle is detected, the second two-dimensional data set detected by the millimeter-wave radar is converted into the laser radar coordinate system by using the above-mentioned parameters, to obtain converted two-dimensional coordinates that correspond one-to-one to the second two-dimensional data set. In this way, the two-dimensional data detected by the millimeter-wave radar is converted into three-dimensional data of the obstacle.

Step 105. Integrate the second point cloud data set and the first converted two-dimensional coordinates to determine a position of the obstacle.

The converted two-dimensional coordinates obtained by converting the two-dimensional data detected by the millimeter-wave radar and the second point cloud data set detected by the laser radar are integrated, so as to determine the position of the obstacle. Data integration is an existing method, and will not be repeatedly described in this embodiment.

Figure 2:
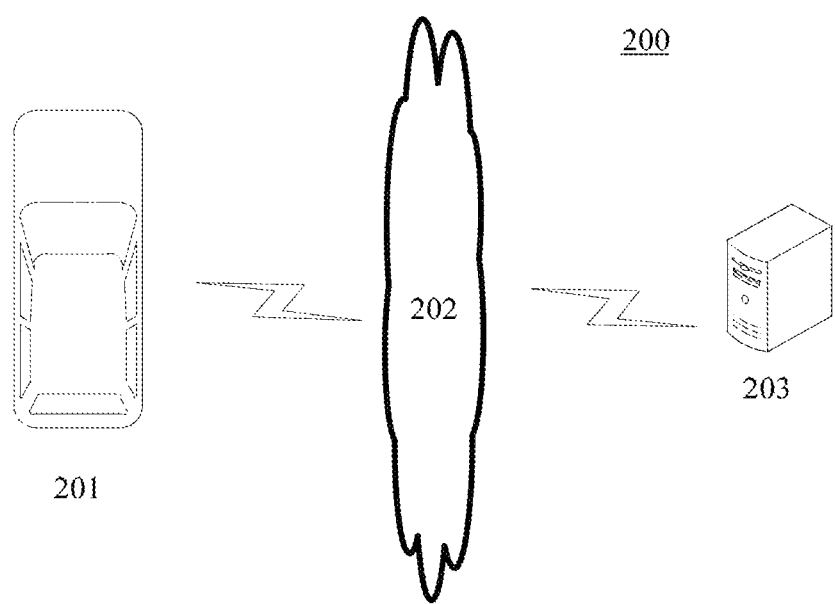
FIG. 2 is a diagram illustrating an exemplary system architecture to which the present disclosure can be applied.

In this embodiment, the above-mentioned steps 101 to 105 may be executed by the driving brain of the vehicle, or may be executed by the server connected to the vehicle. FIG. 2 shows an exemplary system architecture 200 to which an obstacle detection method for a vehicle-mounted radar system or an obstacle detection apparatus for a vehicle-mounted radar system according to an embodiment of the present disclosure can be applied.

As shown in FIG. 2, the system architecture 200 may include a vehicle 201, a network 202, and a server 203. The network 202 is a medium for providing a communication link between the vehicle 201 and the server 203. The network 202 may include various connection types, such as wired and wireless communication links or optical fiber cables.

A vehicle-mounted radar system is mounted on the vehicle 201. The above-mentioned vehicle-mounted radar system may include a laser radar and a millimeter-wave radar (not shown in the figure), for detecting data of calibration objects or obstacles outside the vehicle.

The server 203 may be a server providing various services, for example, a back-end server for processing data detected by the laser radar and the millimeter-wave radar of the vehicle 201. The back-end server 203 may send the processing result (for example, the positions of the obstacles) to the vehicle 201, so that the vehicle 201 can learn the obstacles around the vehicle, providing driving information for autonomous driving.

It should be noted that the obstacle detection method for a vehicle-mounted radar system that is provided in this embodiment of the present disclosure is generally executed by the vehicle 201. Correspondingly, the obstacle detection apparatus for a vehicle-mounted radar system is generally disposed in the vehicle 201.

It should be appreciated that the number of vehicles, the number of networks, and the number of servers in FIG. 2 are merely exemplary. Any number of vehicles, networks, and servers may be set according to implementation requirements.

Figure 3:
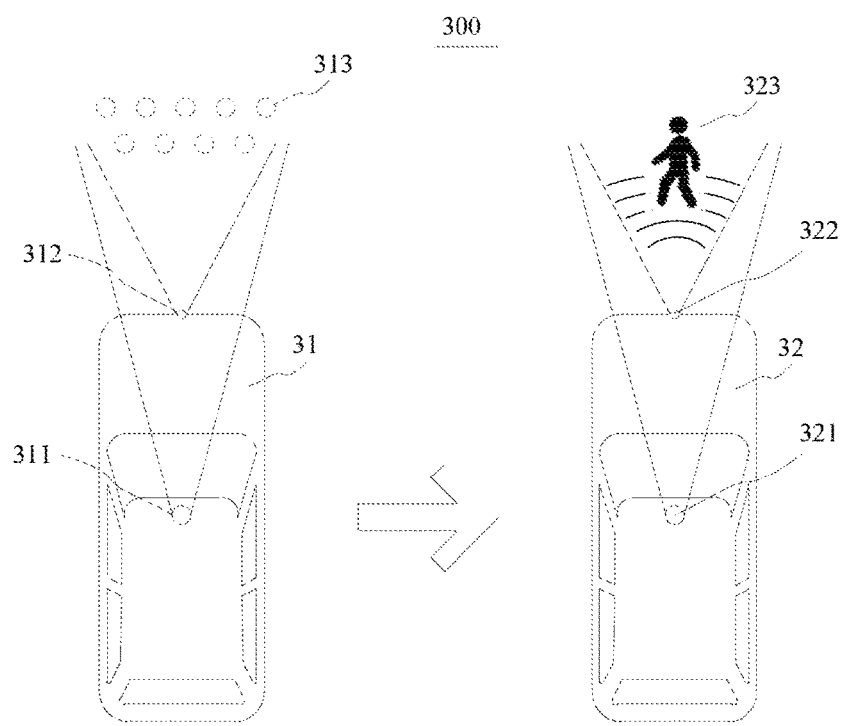
FIG. 3 is a schematic diagram of a disclosure scenario of an obstacle detection method for a vehicle-mounted radar system according to the present disclosure.

Further, referring to FIG. 3, FIG. 3 is a schematic diagram 300 of a disclosure scenario of an obstacle detection method for a vehicle-mounted radar system according to the present disclosure. In the scenario shown in FIG. 3, a laser radar 311 and a millimeter-wave radar 312 are mounted on a vehicle 31. First, the laser radar 311 and the millimeter-wave radar 312 on the vehicle 31 need to be calibrated. A specific process is as follows: The laser radar 311 and the millimeter-wave radar 312 respectively detects data of calibration objects 313. The calibration objects 313 are cylinders placed perpendicular to the ground, and are respectively located at different positions within a common vision of the laser radar 311 and the millimeter-wave radar 312. A height difference between the laser radar 311 and the millimeter-wave radar 312, and an initial turning angle difference and an initial displacement difference converted from the millimeter-wave radar coordinate system to the laser radar coordinate system are determined based on the mounting positions of the laser radar 311 and the millimeter-wave radar 312 on the vehicle 31, and the above-mentioned parameters are optimized, to obtain a calibrated turning angle difference, a calibrated displacement difference, and a calibrated vertical coordinate. After the laser radar 311 and the millimeter-wave radar 312 are calibrated, an image on the right is obtained. The laser radar 321 and the millimeter-wave radar 322 detect data of a pedestrian 313 in front of the vehicle 32, convert the two-dimensional data detected by the millimeter-wave radar 322 into three-dimensional data based on the calibrated turning angle difference, the calibrated displacement difference, and the calibrated vertical coordinate, and integrate the three-dimensional data with point cloud data detected by the laser radar 321, so as to accurately determine a position of the pedestrian 313.

Based on the obstacle detection method for a vehicle-mounted radar system that is provided in the above-mentioned embodiment of the present disclosure, first, data of calibration objects at different positions is collected by using a millimeter-wave radar and a laser radar; the laser radar and the millimeter-wave radar are calibrated by using the data, to determine a turning angle difference, a displacement difference, a vertical coordinate converted from a millimeter-wave radar coordinate system to a laser radar coordinate system, which are required for calibration; two-dimensional data of an obstacle that is detected by the millimeter-wave radar is converted into the laser radar coordinate system based on the above-mentioned parameters, to obtain converted two-dimensional coordinates; finally, the converted two-dimensional coordinates and point cloud data of the obstacle that is detected by the laser radar are integrated, so as to accurately determine a position of the obstacle. Whereby, the present disclosure can effectively implement accurate obstacle detection by using a laser radar and a millimeter-wave radar.

Figure 4:
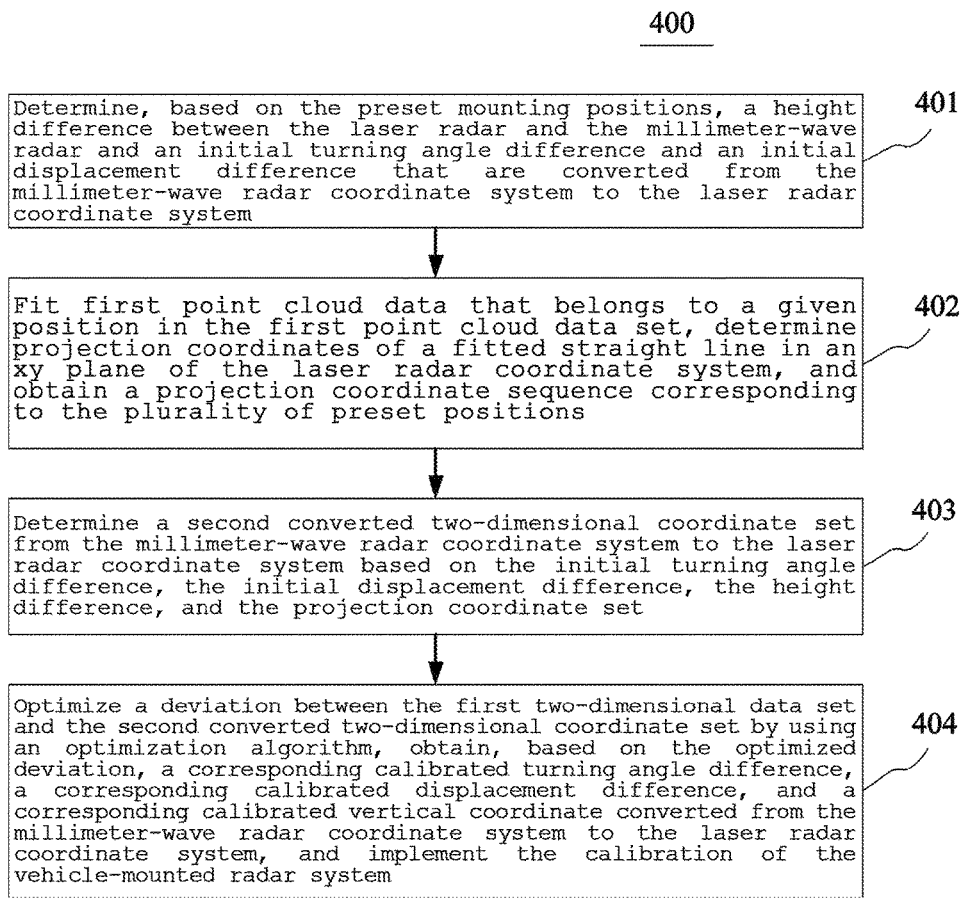
FIG. 4 is a flow chart of calibrating a vehicle-mounted radar system in an obstacle detection method for a vehicle-mounted radar system according to an embodiment of the present disclosure.

FIG. 4 is a flow chart of calibrating a vehicle-mounted radar system in an obstacle detection method for a vehicle-mounted radar system according to an embodiment of the present disclosure. As shown in FIG. 4, the calibration of the vehicle-mounted radar system in this embodiment includes the following steps:

Step 401. Determine, based on the preset mounting positions, a height difference between the laser radar and the millimeter-wave radar and an initial turning angle difference and an initial displacement difference that are converted from the millimeter-wave radar coordinate system to the laser radar coordinate system.

In this embodiment, the above-mentioned preset mounting positions may be obtained from assembly drawings of the vehicle. Because parameters such as the model of the vehicle, structure parameters of the vehicle, and mounting positions and attitudes of sensors in the vehicle are clearly stated in the assembly drawings of the vehicle, the height difference between the laser radar and the millimeter-wave radar and the initial turning angle difference and the initial displacement difference converted from the millimeter-wave radar coordinate system to the laser radar coordinate system can be obtained from the assembly drawings of the vehicle.

In some optional implementations of this embodiment, the above-mentioned step 401 may be specifically implemented through the following steps that are not shown in FIG. 4:

determining three-dimensional coordinates of the preset mounting positions in the vehicle coordinate system; determining a difference between vertical coordinates in the three-dimensional coordinates as the height difference between the laser radar and the millimeter-wave radar; determining the initial turning angle difference based on an angle between a coordinate axis of the laser radar coordinate system and a coordinate axis of the millimeter-wave radar coordinate system; and determining the initial displacement difference based on distances between coordinate axes of the laser radar coordinate system and the millimeter-wave radar coordinate system.

In this implementation, the assembly drawings may include three-dimensional coordinates of the laser radar and the millimeter-wave radar of the vehicle-mounted radar system in the vehicle coordinate system. The difference between vertical coordinates of the three-dimensional coordinates of the laser radar and the millimeter-wave radar may be used as the height difference therebetween. The initial turning angle difference is determined based on an angle between a coordinate axis of the laser radar coordinate system and a coordinate axis of the millimeter-wave radar coordinate system. For example, the initial turning angle difference may be determined based on a pitch angle, a roll angle, and a course angle of the coordinate axis of the millimeter-wave radar in the laser radar coordinate system. The initial displacement difference is determined based on distances between coordinate axes of the laser radar coordinate system and the millimeter-wave radar coordinate system. For example, the initial displacement difference is determined based on the origin of coordinates of the millimeter-wave radar and offsets in the x direction, the y direction, and the z direction of the laser radar coordinate system.

Step 402. Fit first point cloud data that belongs to a given position in the first point cloud data set, determine projection coordinates of a fitted straight line in an xy plane of the laser radar coordinate system, and obtain a projection coordinate sequence corresponding to the plurality of preset positions.

In this embodiment, the laser radar is horizontally attached to the vehicle, and the calibration objects are placed on a level ground. The level ground is a plane parallel to the xy plane in the laser radar coordinate system. Point cloud data of the calibration objects at a given position may be fitted to a straight line in a direction of (0,0,1). Assume that projection coordinates of the fitted straight line at the $i^{th}$ position in the xy plane are $(x_i, y_i, 0)$. A projection coordinate sequence corresponding to the calibration objects at the plurality of preset positions can be obtained.

Step 403. Determine a second converted two-dimensional coordinate set from the millimeter-wave radar coordinate system to the laser radar coordinate system based on the initial turning angle difference, the initial displacement difference, the height difference, and the projection coordinate set.

As can be learned from the analysis in step 402, the point cloud data of the calibration objects at each position detected by the laser radar can be fitted to a straight line, and correspondingly, a projection coordinate set can be obtained. When the two-dimensional data detected by the millimeter-wave radar is converted into laser radar coordinate system, vertical coordinates need to be added for the above-mentioned two-dimensional data. In this embodiment, the height difference between the laser radar and the millimeter-wave radar may be used as the vertical coordinate of the data detected by the millimeter-wave radar. A transition coordinate set for conversion of the above-mentioned two-dimensional data to the laser radar coordinate system may be determined based on the initial turning angle difference, the initial displacement difference, the height difference, and the projection coordinate set that are determined above, and then a converted two-dimensional coordinate set converted to the laser radar coordinate system may be determined based on the transition coordinate set.

In some optional implementations of this embodiment, a horizontal coordinate of each of the projection coordinates in the projection coordinate set is used as a transition horizontal coordinate in a transition coordinate set, a longitudinal coordinate of each of the projection coordinates in the projection coordinate set is used as a transition longitudinal coordinate in the transition coordinate set, and the height difference between the laser radar and the millimeter-wave radar is used as a transition vertical coordinate in the transition coordinate set.

Assuming that $x_{1i}$ represents the horizontal coordinate of the projection of the fitted straight line of the point cloud data of the calibration objects at the $i^{th}$ position in the xy plane, $y_{1i}$ represents the longitudinal coordinate of the projection of the fitted straight line of the point cloud data of the calibration objects at the $i^{th}$ position in the xy plane, and $z_1$ represents the height difference between the laser radar and the millimeter-wave radar, the transition horizontal coordinate at the $i^{th}$ position is $x_{1i}$, the transition longitudinal coordinate at the $i^{th}$ position is $y_{1i}$, and the transition vertical coordinates at all the positions are $z_1$. In this case, the transition coordinate set may be expressed as $(x_{1i}, y_{1i}, z_1)$, where $1 \le i \le n$, and n is the number of the positions of the calibration objects.

The converted two-dimensional coordinates obtained by converting the two-dimensional data detected by the millimeter-wave radar into the laser radar coordinate system may be determined according to the following formula:

$$(x_{2i}, y_{2i}, z_2)^T = R \times (x_{1i}, y_{1i}, z_1)^T + t,$$

where $x_{2i}$ is the horizontal coordinate of the converted two-dimensional coordinates at the $i^{th}$ position, $y_{2i}$ is the longitudinal coordinate of the converted two-dimensional coordinates at the $i^{th}$ position, $z_2$ is the vertical coordinate of the converted two-dimensional coordinates, $(x_{2i}, y_{2i}, z_2)$ is the converted two-dimensional coordinates at the $i^{th}$ position, $(x_{2i}, y_{2i}, z_2)^T$ is a transpose of the converted two-dimensional coordinates at the $i^{th}$ position, R is the initial turning angle difference, $x_{1i}$ is the transition horizontal coordinate at the $i^{th}$ position, $y_{1i}$ is the transition longitudinal coordinate at the $i^{th}$ position, $z_1$ is the transition vertical coordinate, $(x_{1i}, y_{1i}, z_1)$ is the transition coordinates at the $i^{th}$ position, $(x_{1i}, y_{1i}, z_1)^T$ is a transpose of the transition coordinates at the $i^{th}$ position, and t is the initial displacement difference.

Step 404. Optimize a deviation between the first two-dimensional data set and the second converted two-dimensional coordinate set by using an optimization algorithm, obtain, based on the optimized deviation, a corresponding calibrated turning angle difference, a corresponding calibrated displacement difference, and a corresponding calibrated vertical coordinate converted from the millimeter-wave radar coordinate system to the laser radar coordinate system, and implement the calibration of the vehicle-mounted radar system.

In this embodiment, the optimization algorithm may be, for example, a gradient descent method or a least square method. The deviation between the first two-dimensional data set and the second converted two-dimensional coordinate set may be calculated according to the following formula:

$$\sigma^2 = \sum_{i=1}^{n} [(x_{ri}^2 - x_{2i}^2) + (y_{ri}^2 - y_{2i}^2) + z_2^2],$$

where $\sigma^2$ is the deviation, i is a natural number, n is the number of the plurality of preset positions, $x_{ri}$ is a horizontal coordinate of first two-dimensional coordinates at the $i^{th}$ position that are detected by the millimeter-wave radar, $y_{ri}$ is a longitudinal coordinate of the first two-dimensional coordinates at the $i^{th}$ position that are detected by the millimeter-wave radar, $x_{2i}$ is the horizontal coordinate of the converted two-dimensional coordinates at the $i^{th}$ position, $y_{2i}$ is the longitudinal coordinate of the converted two-dimensional coordinates at the $i^{th}$ position, and $z_2$ is the vertical coordinate of the converted two-dimensional coordinates.

When the above-mentioned deviation is optimized by using the optimization algorithm, the optimization may be implemented by continuously adjusting the values of R, t, and $z_1$. In a specific implementation, a deviation corresponding to the adjusted values of R, t, and $z_1$ may be calculated and compared with a preset threshold. When the above-mentioned deviation is less than the above-mentioned threshold, the optimization is ended, thus completing the calibration of the vehicle-mounted radar system. The current values of R, t, and $z_1$ are respectively used as the calibrated turning angle difference, the calibrated displacement difference, and the calibrated vertical coordinate.

The obstacle detection method for a vehicle-mounted radar system according to the above-mentioned embodiment of the present disclosure highlights the step of calibrating the vehicle-mounted radar system. Therefore, the solution described in this embodiment can more effectively use the two-dimensional data detected by the millimeter-wave radar by converting the two-dimensional data into three-dimensional data, thereby detecting the position of the obstacle more accurately.

Figure 5:
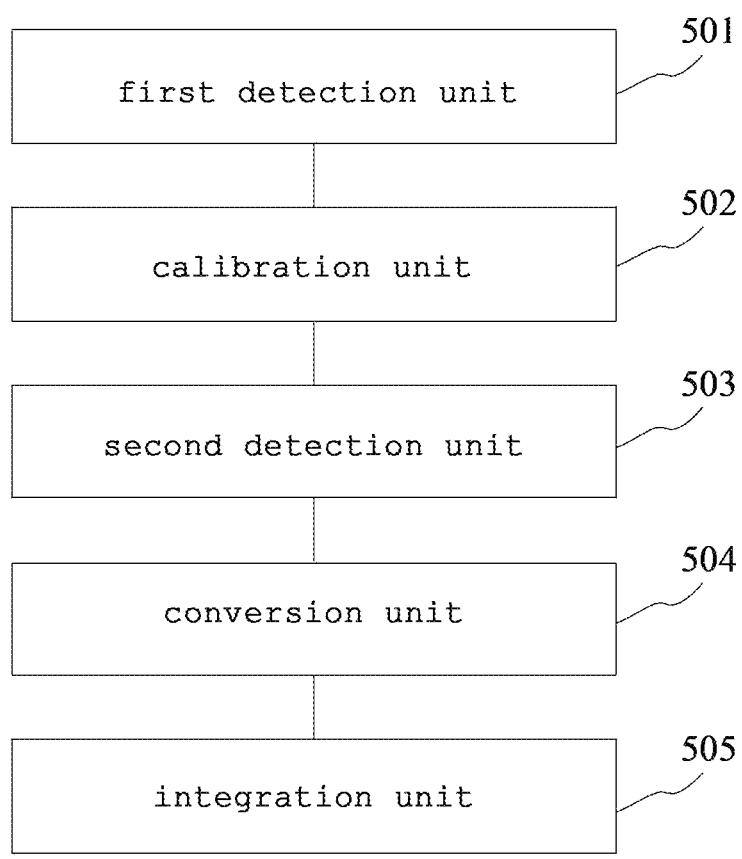
FIG. 5 is a schematic structural diagram of an obstacle detection apparatus for a vehicle-mounted radar system according to an embodiment of the present disclosure.

Further, referring to FIG. 5, as an implementation of the methods shown in the above-mentioned figures, the present disclosure provides an embodiment of an obstacle detection apparatus for a vehicle-mounted radar system. This apparatus embodiment corresponds to the method embodiment shown in FIG. 1. The apparatus may be specifically applied to various electronic devices.

As shown in FIG. 5, the obstacle detection apparatus 500 for a vehicle-mounted radar system according to this embodiment includes: a first detection unit 501, a calibration unit 502, a second detection unit 503, a conversion unit 504, and an integration unit 505.

The first detection unit 501 is used for detecting a first point cloud data set of calibration objects located at a plurality of preset positions by using the laser radar and detecting a first two-dimensional data set of the calibration objects by using the millimeter-wave radar.

The calibration unit 502 is used for calibrating the vehicle-mounted radar system based on the preset mounting positions, the first point cloud data set detected by the laser radar, and the first two-dimensional data set detected by the millimeter-wave radar, to obtain a calibrated turning angle difference, a calibrated displacement difference, and a calibrated vertical coordinate that are converted from a millimeter-wave radar coordinate system to a laser radar coordinate system.

The second detection unit 503 is used for detecting a second point cloud data set of an obstacle by using the laser radar and detecting a second two-dimensional data set of the obstacle by using the millimeter-wave radar.

The conversion unit 504 is used for converting the second two-dimensional data set into the laser radar coordinate system based on the calibrated turning angle difference, the calibrated displacement difference, and the calibrated vertical coordinate that are obtained by the calibration unit 502, to obtain converted three-dimensional coordinates.

The integration unit 505 is used for integrating the second point cloud data set detected by the laser radar and the converted two-dimensional coordinates obtained by the conversion unit 504, to determine a position of the obstacle.

In some optional implementations of this embodiment, the above-mentioned calibration unit 502 may further include a first determining module, a projection module, a second determining module, and a calibration module that are not shown in FIG. 5.

The first determining module is used for determining, based on the preset mounting positions, a height difference between the laser radar and the millimeter-wave radar and an initial turning angle difference and an initial displacement difference that are converted from the millimeter-wave radar coordinate system to the laser radar coordinate system.

In some optional implementations of this embodiment, the above-mentioned first determining module may further include a three-dimensional coordinates determining submodule, a height difference determining submodule, an initial turning angle difference determining submodule, and an initial displacement difference determining submodule that are not shown in FIG. 5.

The three-dimensional coordinates determining submodule is used for determining three-dimensional coordinates of the preset mounting positions in the vehicle coordinate system.

The height difference determining submodule is used for determining a difference between vertical coordinates in the three-dimensional coordinates as the height difference between the laser radar and the millimeter-wave radar.

The initial turning angle difference determining submodule is used for determining the initial turning angle difference based on an angle between a coordinate axis of the laser radar coordinate system and a coordinate axis of the millimeter-wave radar coordinate system.

The initial displacement difference determining submodule is used for determining the initial displacement difference based on distances between coordinate axes of the laser radar coordinate system and the millimeter-wave radar coordinate system.

The projection module is used for fitting first point cloud data that belongs to a given position in the first point cloud data set detected by the laser radar in the first detection unit, determining projection coordinates of a fitted straight line in an xy plane of the laser radar coordinate system, and obtaining a projection coordinate sequence corresponding to the plurality of preset positions.

In some optional implementations of this embodiment, the above-mentioned projection module may further include a fitting submodule, a projection submodule, and a combining submodule that are not shown in FIG. 5.

The fitting submodule is used for fitting, in the laser radar coordinate system, the first point cloud data that belongs to the given position in the first point cloud data set to a vertical straight line.

The projection submodule is used for determining projection coordinates of the fitted straight line belonging to the given position on the xy plane.

The combining submodule is used for combining projection coordinates of the plurality of preset positions, to obtain the projection coordinate sequence.

The second determining module is used for determining a second converted two-dimensional coordinate set from the millimeter-wave radar coordinate system to the laser radar coordinate system based on the initial turning angle difference, the initial displacement difference, the height difference, and the projection coordinate set that are obtained by the first determining module.

In some optional implementations of this embodiment, the above-mentioned second determining module may further include a transition horizontal coordinate determining submodule, a transition longitudinal coordinate determining submodule, a transition vertical coordinate determining submodule, and a converted two-dimensional coordinates determining submodule that are not shown in FIG. 5.

The transition horizontal coordinate determining submodule is used for using a horizontal coordinate of each of the projection coordinates in the projection coordinate set as a transition horizontal coordinate in a transition coordinate set.

The transition longitudinal coordinate determining submodule is used for using a longitudinal coordinate of each of the projection coordinates in the projection coordinate set as a transition longitudinal coordinate in the transition coordinate set.

The transition vertical coordinate determining submodule is used for using the height difference as a transition vertical coordinate in the transition coordinate set.

The converted two-dimensional coordinates determining submodule is used for determining the second converted two-dimensional coordinate set from the millimeter-wave radar coordinate system to the laser radar coordinate system according to the following formula:

$$(x_{2i}, y_{2i}, z_2)^T = R \times (x_{1i}, y_{1i}, z_1)^T + t,$$

where $x_{2i}$ is the horizontal coordinate of the second converted two-dimensional coordinates at the $i^{th}$ position in the second converted two-dimensional coordinate set, $y_{2i}$ is the longitudinal coordinate of the second converted two-dimensional coordinates at the $i^{th}$ position in the second converted two-dimensional coordinate set, $z_2$ is the vertical coordinate of the second converted two-dimensional coordinates, $(x_{2i}, y_{2i}, z_2)$ is the second converted two-dimensional coordinates at the $i^{th}$ position, $(x_{2i}, y_{2i}, z_2)^T$ is a transpose of the second converted two-dimensional coordinates at the $i^{th}$ position, R is the initial turning angle difference, $x_{1i}$ is the transition horizontal coordinate at the $i^{th}$ position, $y_{1i}$ is the transition longitudinal coordinate at the $i^{th}$ position, $z_1$ is the transition vertical coordinate, $(x_{1i}, y_{1i}, z_1)$ is the transition coordinates at the $i^{th}$ position, $(x_{1i}, y_{1i}, z_1)^T$ is a transpose of the transition coordinates at the $i^{th}$ position, and t is the initial displacement difference.

The calibration module is used for optimizing a deviation between the first two-dimensional data set detected by the laser radar and the second converted two-dimensional coordinate set obtained by the second determining module by using an optimization algorithm, obtaining, based on the optimized deviation, a corresponding calibrated turning angle difference, a corresponding calibrated displacement difference, and a corresponding calibrated vertical coordinate converted from the millimeter-wave radar coordinate system to the laser radar coordinate system, and implementing the calibration of the vehicle-mounted radar system.

In some optional implementations of this embodiment, the above-mentioned calibration module may further include a deviation determining submodule and an optimization submodule that are not shown in FIG. 5.

The deviation determining submodule is used for determining the deviation between the first two-dimensional data set and the second converted two-dimensional coordinate set according to the following formula:

$$\sigma^2 = \sum_{i=1}^{n} [(x_{ri}^2 - x_{2i}^2) + (y_{ri}^2 - y_{2i}^2) + z_2^2],$$

where $\sigma^2$ is the deviation, i is a natural number, n is the number of the plurality of preset positions, $x_{ri}$ is a horizontal coordinate of first two-dimensional coordinates at the $i^{th}$ position that are detected by the millimeter-wave radar, $y_{ri}$ is a longitudinal coordinate of the first two-dimensional coordinates at the $i^{th}$ position that are detected by the millimeter-wave radar, $x_{2i}$ is the horizontal coordinate of the second converted two-dimensional coordinates at the $i^{th}$ position in the second converted two-dimensional coordinate set, $y_{2i}$ is the longitudinal coordinate of the second converted two-dimensional coordinates at the $i^{th}$ position in the second converted two-dimensional coordinate set, and $z_2$ is the vertical coordinate of the second converted two-dimensional coordinates.

The optimization submodule is used for optimizing the deviation by using the optimization algorithm, and determining the calibrated turning angle difference, the calibrated displacement difference, and the calibrated vertical coordinate.

According to the obstacle detection apparatus for a vehicle-mounted radar system that is provided in the above-mentioned embodiment of the present disclosure, first, the first detection unit collects data of calibration objects at different positions by using a millimeter-wave radar and a laser radar; the calibration unit calibrates the laser radar and the millimeter-wave radar by using the data, to determine a turning angle difference, a displacement difference, a vertical coordinate converted from a millimeter-wave radar coordinate system to a laser radar coordinate system, which are required for calibration; the conversion unit converts two-dimensional data of an obstacle that is detected by the second detection unit by using the millimeter-wave radar into the laser radar coordinate system based on the above-mentioned parameters, to obtain converted two-dimensional coordinates; finally, the integration unit integrates the converted two-dimensional coordinates and point cloud data of the obstacle that is detected by the laser radar, so as to accurately determine a position of the obstacle. Whereby, the apparatus can effectively implement accurate obstacle detection by using a laser radar and a millimeter-wave radar.

It should be appreciated that the unit 501 to the unit 505 in the obstacle detection apparatus 500 for a vehicle-mounted radar system respectively correspond to the steps in the method described with reference to FIG. 1. Therefore, the operations and features described above in the obstacle detection method for a vehicle-mounted radar system also apply to the apparatus 500 and the units included therein, and will not be repeatedly described here. The corresponding units in the apparatus 500 may cooperate with units in a vehicle to implement the solution of the embodiments of the present disclosure.

In the above-mentioned embodiments of the present disclosure, the first point cloud data set and the second point cloud data set are merely for purpose of distinguishing two different point cloud data sets, the first two-dimensional data set and the second two-dimensional data set are merely for purpose of distinguishing two different two-dimensional data sets, the first detection unit and the second detection unit are merely for purpose of distinguishing two different detection units, and the first determining module and the second determining module are merely for purpose of distinguishing two different determining modules. It should be appreciated that by those skilled in the art that the terms "first" and "second" does not constitute any special limitation on the point cloud data sets, the two-dimensional data sets, the detection units, and the determining modules.

Figure 6:
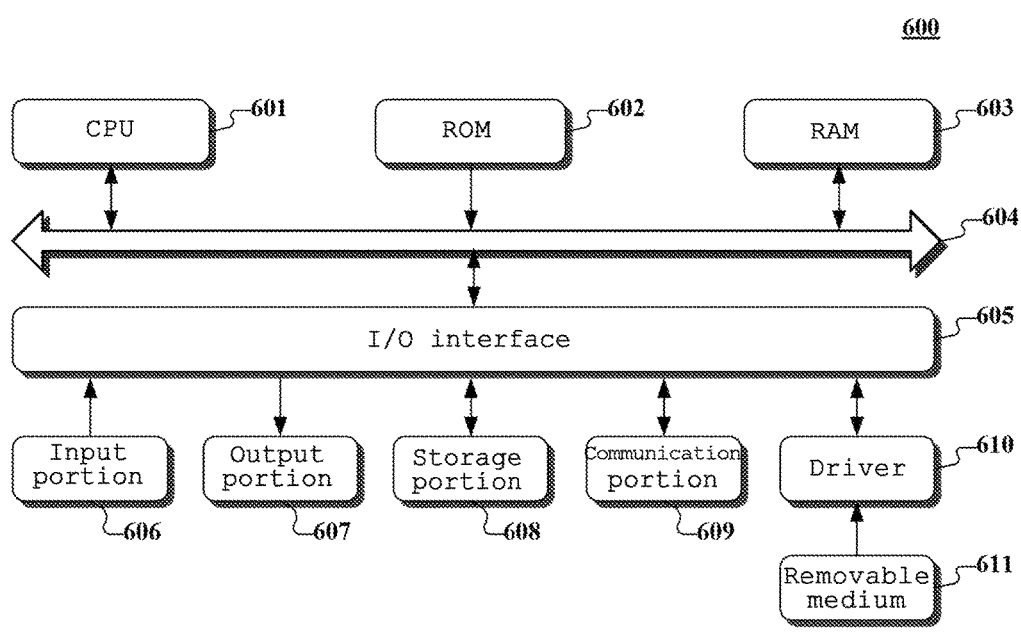
FIG. 6 is a schematic structural diagram of a computer system adapted to implement an obstacle detection apparatus for a vehicle-mounted radar system according to an embodiment of the present disclosure.

Referring to FIG. 6, a schematic structural diagram of a computer system 600 adapted to implement an obstacle detection apparatus for a vehicle-mounted radar system of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow charts may be implemented in a computer software program. For example, an embodiment of the present disclosure includes a computer program product, which comprises a computer program that is tangibly embedded in a machine-readable medium. The computer program comprises program codes for executing the method illustrated in the flow chart. In such an embodiment, the computer program may be downloaded and installed from a network via the communication portion 609, and/or may be installed from the removable media 611. The computer program, when executed by the central processing unit (CPU), executes the functionalities as claimed in the method of the present disclosure.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a first detection unit, a calibration unit, a second detection unit and a conversion unit, where the names of these units or modules are not considered as a limitation to the units or modules. For example, the first detection unit may also be described as "a unit for detecting a first point cloud data set of calibration objects located at a plurality of preset positions by using the laser radar and detecting a first two-dimensional data set of the calibration objects by using the millimeter-wave radar."

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs, when the one or more programs are executed by a device, the device: detecting a first point cloud data set of calibration objects located at a plurality of preset positions by using the laser radar and detecting a first two-dimensional data set of the calibration objects by using the millimeter-wave radar; calibrating the vehicle-mounted radar system based on the preset mounting positions, the first point cloud data set, and the first two-dimensional data set, to obtain a calibrated turning angle difference, a calibrated displacement difference, and a calibrated vertical coordinate that are converted from a millimeter-wave radar coordinate system to a laser radar coordinate system; detecting a second point cloud data set of an obstacle by using the laser radar and detecting a second two-dimensional data set of the obstacle by using the millimeter-wave radar; converting the second two-dimensional data set into the laser radar coordinate system based on the calibrated turning angle difference, the calibrated displacement difference, and the calibrated vertical coordinate, to obtain first converted two-dimensional coordinates; and integrating the second point cloud data set and the first converted two-dimensional coordinates to determine a position of the obstacle.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. An obstacle detection method for a vehicle-mounted radar system, the vehicle-mounted radar system comprising a laser radar and a millimeter-wave radar located at preset mounting positions, the method comprising:

detecting a first point cloud data set of calibration objects located at a plurality of preset positions by using the laser radar and detecting a first two-dimensional data set of the calibration objects by using the millimeter-wave radar;

calibrating the vehicle-mounted radar system based on the preset mounting positions, the first point cloud data set, and the first two-dimensional data set, to obtain a calibrated turning angle difference, a calibrated displacement difference, and a calibrated vertical coordinate that are converted from a millimeter-wave radar coordinate system to a laser radar coordinate system;

detecting a second point cloud data set of an obstacle by using the laser radar and detecting a second two-dimensional data set of the obstacle by using the millimeter-wave radar;

converting the second two-dimensional data set into the laser radar coordinate system based on the calibrated turning angle difference, the calibrated displacement difference, and the calibrated vertical coordinate, to obtain first converted two-dimensional coordinates; and integrating the second point cloud data set and the first converted two-dimensional coordinates to determine a position of the obstacle.

2. The method according to claim 1, wherein the calibrating the vehicle-mounted radar system based on the preset mounting positions, the first point cloud data set, and the first two-dimensional data set comprises:

determining, based on the preset mounting positions, a height difference between the laser radar and the millimeter-wave radar and an initial turning angle difference and an initial displacement difference that are converted from the millimeter-wave radar coordinate system to the laser radar coordinate system;

fitting first point cloud data belonging to a given position in the first point cloud data set, determining projection coordinates of a fitted straight line in an xy plane of the laser radar coordinate system, and obtaining a projection coordinate sequence corresponding to the plurality of preset positions;

determining a second converted two-dimensional coordinate set from the millimeter-wave radar coordinate system to the laser radar coordinate system based on the initial turning angle difference, the initial displacement difference, the height difference, and the projection coordinate set; and optimizing a deviation between the first two-dimensional data set and the second converted two-dimensional coordinate set using an optimization algorithm, obtaining, based on the optimized deviation, a corresponding calibrated turning angle difference, a corresponding calibrated displacement difference, and a corresponding calibrated vertical coordinate converted from the millimeter-wave radar coordinate system to the laser radar coordinate system, and completing calibrating of the vehicle-mounted radar system.

3. The method according to claim 2, wherein the determining, based on the preset mounting positions, a height difference between the laser radar and the millimeter-wave radar and an initial turning angle difference and an initial displacement difference that are converted from the millimeter-wave radar coordinate system to the laser radar coordinate system comprises:

determining three-dimensional coordinates of the preset mounting positions in the vehicle coordinate system;

determining a difference between vertical coordinates in the three-dimensional coordinates as the height difference between the laser radar and the millimeter-wave radar;

determining the initial turning angle difference based on an angle between a coordinate axis of the laser radar coordinate system and a coordinate axis of the millimeter-wave radar coordinate system; and determining the initial displacement difference based on distances between coordinate axes of the laser radar coordinate system and the millimeter-wave radar coordinate system.

4. The method according to claim 2, wherein the fitting first point cloud data that belongs to a same position in the first point cloud data set, determining projection coordinates of a fitted straight line in an xy plane of the laser radar coordinate system, and obtaining a projection coordinate sequence corresponding to the plurality of preset positions comprises:

fitting, in the laser radar coordinate system, the first point cloud data belonging to the given position in the first point cloud data set to a vertical straight line;

determining projection coordinates of the fitted straight line belonging to the given position on the xy plane; and combining projection coordinates of the plurality of preset positions, to obtain the projection coordinate sequence.

5. The method according to claim 2, wherein the determining a second converted two-dimensional coordinate set from the millimeter-wave radar coordinate system to the laser radar coordinate system based on the initial turning angle difference, the initial displacement difference, the height difference, and the projection coordinate set comprises:

using a horizontal coordinate of each of the projection coordinates in the projection coordinate set as a transition horizontal coordinate in a transition coordinate set;

using a longitudinal coordinate of each of the projection coordinates in the projection coordinate set as a transition longitudinal coordinate in the transition coordinate set;

using the height difference as a transition vertical coordinate in the transition coordinate set; and determining the second converted two-dimensional coordinate set from the millimeter-wave radar coordinate system to the laser radar coordinate system according to the following formula:

$$(x_{2i}, y_{2i}, z_2)^T = R \times (x_{1i}, y_{1i}, z_1)^T + t,$$

wherein $x_{2i}$ is the horizontal coordinate of the second converted two-dimensional coordinates at the $i^{th}$ position in the second converted two-dimensional coordinate set, $y_{2i}$ is the longitudinal coordinate of the second converted two-dimensional coordinates at the $i^{th}$ position in the second converted two-dimensional coordinate set, $z_2$ is the vertical coordinate of the second converted two-dimensional coordinates, $(x_{2i}, y_{2i}, z_2)$ is the second converted two-dimensional coordinates at the $i^{th}$ position, $(x_{2i}, y_{2i}, z_2)^T$ is a transpose of the second converted two-dimensional coordinates at the $i^{th}$ position, R is the initial turning angle difference, $x_{1i}$ is the transition horizontal coordinate at the $i^{th}$ position, $y_{1i}$ is the transition longitudinal coordinate at the $i^{th}$ position, $z_1$ is the transition vertical coordinate, $(x_{1i}, y_{1i}, z_1)$ the transition coordinates at the $i^{th}$ position, $(x_{1i}, y_{1i}, z_1)^T$ is a transpose of the transition coordinates at the $i^{th}$ position, and t is the initial displacement difference.

6. The method according to claim 2, wherein the optimizing a deviation between the first two-dimensional data set and the second converted two-dimensional coordinate set by using an optimization algorithm comprises:

determining the deviation between the first two-dimensional data set and the second converted two-dimensional coordinate set according to the following formula:

$$\sigma^2 = \sum_{i=1}^{n} [(x_{ri}^2 - x_{2i}^2) + (y_{ri}^2 - y_{2i}^2) + z_2^2],$$

wherein $\sigma^2$ is the deviation, i is a natural number, n is a number of the plurality of preset positions, $x_{ri}$ is a horizontal coordinate of first two-dimensional coordinates at the $i^{th}$ position that are detected by the millimeter-wave radar, $y_{ri}$ is a longitudinal coordinate of the first two-dimensional coordinates at the $i^{th}$ position that are detected by the millimeter-wave radar, $x_{2i}$ is the horizontal coordinate of the second converted two-dimensional coordinates at the $i^{th}$ position in the second converted two-dimensional coordinate set, $y_{2i}$ is the longitudinal coordinate of the second converted two-dimensional coordinates at the $i^{th}$ position in the second converted two-dimensional coordinate set, and $z_2$ is the vertical coordinate of the second converted two-dimensional coordinates; and optimizing the deviation by using the optimization algorithm, and determining the calibrated turning angle difference, the calibrated displacement difference, and the calibrated vertical coordinate.

7. An obstacle detection apparatus for a vehicle-mounted radar system, the vehicle-mounted radar system comprising a laser radar and a millimeter-wave radar located at preset mounting positions, the apparatus comprising:

at least one processor; and a memory storing instructions, which when executed by the at least one processor, cause the at least one processor to perform operations, the operations comprising:

detecting a first point cloud data set of calibration objects located at a plurality of preset positions by using the laser radar and detecting a first two-dimensional data set of the calibration objects by using the millimeter-wave radar;

calibrating the vehicle-mounted radar system based on the preset mounting positions, the first point cloud data set, and the first two-dimensional data set, to obtain a calibrated turning angle difference, a calibrated displacement difference, and a calibrated vertical coordinate that are converted from a millimeter-wave radar coordinate system to a laser radar coordinate system;

detecting a second point cloud data set of an obstacle by using the laser radar and detecting a second two-dimensional data set of the obstacle by using the millimeter-wave radar;

converting the second two-dimensional data set into the laser radar coordinate system based on the calibrated turning angle difference, the calibrated displacement difference, and the calibrated vertical coordinate, to obtain first converted two-dimensional coordinates; and integrating the second point cloud data set and the first converted two-dimensional coordinates to determine a position of the obstacle.

8. The apparatus according to claim 7, wherein the calibrating the vehicle-mounted radar system based on the preset mounting positions, the first point cloud data set, and the first two-dimensional data set, to obtain a calibrated turning angle difference, a calibrated displacement difference, and a calibrated vertical coordinate that are converted from a millimeter-wave radar coordinate system to a laser radar coordinate system comprises:

determining, based on the preset mounting positions, a height difference between the laser radar and the millimeter-wave radar and an initial turning angle difference and an initial displacement difference that are converted from the millimeter-wave radar coordinate system to the laser radar coordinate system;

fitting first point cloud data belonging to a given position in the first point cloud data set, determining projection coordinates of a fitted straight line in an xy plane of the laser radar coordinate system, and obtaining a projection coordinate sequence corresponding to the plurality of preset positions;

determining a second converted two-dimensional coordinate set from the millimeter-wave radar coordinate system to the laser radar coordinate system based on the initial turning angle difference, the initial displacement difference, the height difference, and the projection coordinate set; and optimizing a deviation between the first two-dimensional data set and the second converted two-dimensional coordinate set by using an optimization algorithm, obtaining, based on the optimized deviation, a corresponding calibrated turning angle difference, a corresponding calibrated displacement difference, and a corresponding calibrated vertical coordinate converted from the millimeter-wave radar coordinate system to the laser radar coordinate system, and implementing the calibration of the vehicle-mounted radar system.

9. The apparatus according to claim 8, wherein the determining, based on the preset mounting positions, a height difference between the laser radar and the millimeter-wave radar and an initial turning angle difference and an initial displacement difference that are converted from the millimeter-wave radar coordinate system to the laser radar coordinate system comprises:

determining three-dimensional coordinates of the preset mounting positions in the vehicle coordinate system;

determining a difference between vertical coordinates in the three-dimensional coordinates as the height difference between the laser radar and the millimeter-wave radar;

determining the initial turning angle difference based on an angle between a coordinate axis of the laser radar coordinate system and a coordinate axis of the millimeter-wave radar coordinate system; and determining the initial displacement difference based on distances between coordinate axes of the laser radar coordinate system and the millimeter-wave radar coordinate system.

10. The apparatus according to claim 8, wherein the fitting first point cloud data belonging to a given position in the first point cloud data set, determining projection coordinates of a fitted straight line in an xy plane of the laser radar coordinate system, and obtaining a projection coordinate sequence corresponding to the plurality of preset positions comprises:

fitting, in the laser radar coordinate system, the first point cloud data belonging to the given position in the first point cloud data set to a vertical straight line;

determining projection coordinates of the fitted straight line belonging to the given position on the xy plane; and combining projection coordinates of the plurality of preset positions, to obtain the projection coordinate sequence.

11. The apparatus according to claim 8, wherein the determining a second converted two-dimensional coordinate set from the millimeter-wave radar coordinate system to the laser radar coordinate system based on the initial turning angle difference, the initial displacement difference, the height difference, and the projection coordinate set comprises:

using a horizontal coordinate of each of the projection coordinates in the projection coordinate set as a transition horizontal coordinate in a transition coordinate set;

using a longitudinal coordinate of each of the projection coordinates in the projection coordinate set as a transition longitudinal coordinate in the transition coordinate set;

using the height difference as a transition vertical coordinate in the transition coordinate set; and determining the second converted two-dimensional coordinate set from the millimeter-wave radar coordinate system to the laser radar coordinate system according to the following formula:

$$(x_{2i}, y_{2i}, z_2)^T = R \times (x_{1i}, y_{1i}, z_1)^T + t,$$

wherein $x_{2i}$ is the horizontal coordinate of the second converted two-dimensional coordinates at the $i^{th}$ position in the second converted two-dimensional coordinate set, $y_{2i}$ is the longitudinal coordinate of the second converted two-dimensional coordinates at the $i^{th}$ position in the second converted two-dimensional coordinate set, $z_2$ is the vertical coordinate of the second converted two-dimensional coordinates, $(x_{2i}, y_{2i}, z_2)$ is the second converted two-dimensional coordinates at the $i^{th}$ position, $(x_{2i}, y_{2i}, z_2)^T$ is a transpose of the second converted two-dimensional coordinates at the $i^{th}$ position, R is the initial turning angle difference, $x_{1i}$ is the transition horizontal coordinate at the $i^{th}$ position, $y_{1i}$ is the transition longitudinal coordinate at the $i^{th}$ position, $z_1$ is the) transition vertical coordinate, $(x_{1i}, y_{1i}, z_1)$ is the transition coordinates at the $i^{th}$ position, $(x_{1i}, y_{1i}, z_1)^T$ is a transpose of the transition coordinates at the $i^{th}$ position, and t is the initial displacement difference.

12. The apparatus according to claim 8, wherein the optimizing a deviation between the first two-dimensional data set and the second converted two-dimensional coordinate set by using an optimization algorithm, obtaining, based on the optimized deviation, a corresponding calibrated turning angle difference, a corresponding calibrated displacement difference, and a corresponding calibrated vertical coordinate converted from the millimeter-wave radar coordinate system to the laser radar coordinate system, and implementing the calibration of the vehicle-mounted radar system comprises:

determining the deviation between the first two-dimensional data set and the second converted two-dimensional coordinate set according to the following formula:

$$\sigma^2 = \sum_{i=1}^{n} [(x_{ri}^2 - x_{2i}^2) + (y_{ri}^2 - y_{2i}^2) + z_2^2],$$

wherein $\sigma^2$ is the deviation, i is a natural number, n is a number of the plurality of preset positions, $x_{ri}$ is a horizontal coordinate of first two-dimensional coordinates at the $i^{th}$ position that are detected by the millimeter-wave radar, $y_{ri}$ is a longitudinal coordinate of the first two-dimensional coordinates at the $i^{th}$ position that are detected by the millimeter-wave radar, $x_{2i}$ is the horizontal coordinate of the second converted two-dimensional coordinates at the $i^{th}$ position in the second converted two-dimensional coordinate set, $y_{2i}$ is the longitudinal coordinate of the second converted two-dimensional coordinates at the $i^{th}$ position in the second converted two-dimensional coordinate set, and $z_2$ is the vertical coordinate of the second converted two-dimensional coordinates; and optimizing the deviation by using the optimization algorithm, and determining the calibrated turning angle difference, the calibrated displacement difference, and the calibrated vertical coordinate.

13. A non-transitory computer storage medium storing a computer program in a vehicle-mounted radar system, the vehicle-mounted radar system comprising a laser radar and a millimeter-wave radar located at preset mounting positions, the computer program when executed by one or more processors, cause the one or more processors to perform operations, the operations comprising:

detecting a first point cloud data set of calibration objects located at a plurality of preset positions by using the laser radar and detecting a first two-dimensional data set of the calibration objects by using the millimeter-wave radar;

calibrating the vehicle-mounted radar system based on the preset mounting positions, the first point cloud data set, and the first two-dimensional data set, to obtain a calibrated turning angle difference, a calibrated displacement difference, and a calibrated vertical coordinate that are converted from a millimeter-wave radar coordinate system to a laser radar coordinate system;

detecting a second point cloud data set of an obstacle by using the laser radar and detecting a second two-dimensional data set of the obstacle by using the millimeter-wave radar;

converting the second two-dimensional data set into the laser radar coordinate system based on the calibrated turning angle difference, the calibrated displacement difference, and the calibrated vertical coordinate, to obtain first converted two-dimensional coordinates; and integrating the second point cloud data set and the first converted two-dimensional coordinates to determine a position of the obstacle.

14. The non-transitory computer storage medium according to claim 13, wherein the calibrating the vehicle-mounted radar system based on the preset mounting positions, the first point cloud data set, and the first two-dimensional data set comprises:

determining, based on the preset mounting positions, a height difference between the laser radar and the millimeter-wave radar and an initial turning angle difference and an initial displacement difference that are converted from the millimeter-wave radar coordinate system to the laser radar coordinate system;

fitting first point cloud data belonging to a given position in the first point cloud data set, determining projection coordinates of a fitted straight line in an xy plane of the laser radar coordinate system, and obtaining a projection coordinate sequence corresponding to the plurality of preset positions;

determining a second converted two-dimensional coordinate set from the millimeter-wave radar coordinate system to the laser radar coordinate system based on the initial turning angle difference, the initial displacement difference, the height difference, and the projection coordinate set; and optimizing a deviation between the first two-dimensional data set and the second converted two-dimensional coordinate set using an optimization algorithm, obtaining, based on the optimized deviation, a corresponding calibrated turning angle difference, a corresponding calibrated displacement difference, and a corresponding calibrated vertical coordinate converted from the millimeter-wave radar coordinate system to the laser radar coordinate system, and completing calibrating of the vehicle-mounted radar system.

15. The non-transitory computer storage medium according to claim 14, wherein the determining, based on the preset mounting positions, a height difference between the laser radar and the millimeter-wave radar and an initial turning angle difference and an initial displacement difference that are converted from the millimeter-wave radar coordinate system to the laser radar coordinate system comprises:
    determining three-dimensional coordinates of the preset mounting positions in the vehicle coordinate system;
    determining a difference between vertical coordinates in the three-dimensional coordinates as the height difference between the laser radar and the millimeter-wave radar;
    determining the initial turning angle difference based on an angle between a coordinate axis of the laser radar coordinate system and a coordinate axis of the millimeter-wave radar coordinate system; and
    determining the initial displacement difference based on distances between coordinate axes of the laser radar coordinate system and the millimeter-wave radar coordinate system.

16. The non-transitory computer storage medium according to claim 14, wherein the fitting first point cloud data that belongs to a same position in the first point cloud data set, determining projection coordinates of a fitted straight line in an xy plane of the laser radar coordinate system, and obtaining a projection coordinate sequence corresponding to the plurality of preset positions comprises:
    fitting, in the laser radar coordinate system, the first point cloud data belonging to the given position in the first point cloud data set to a vertical straight line;
    determining projection coordinates of the fitted straight line belonging to the given position on the xy plane; and
    combining projection coordinates of the plurality of preset positions, to obtain the projection coordinate sequence.

17. The non-transitory computer storage medium according to claim 14, wherein the determining a second converted two-dimensional coordinate set from the millimeter-wave radar coordinate system to the laser radar coordinate system based on the initial turning angle difference, the initial displacement difference, the height difference, and the projection coordinate set comprises:
    using a horizontal coordinate of each of the projection coordinates in the projection coordinate set as a transition horizontal coordinate in a transition coordinate set;
    using a longitudinal coordinate of each of the projection coordinates in the projection coordinate set as a transition longitudinal coordinate in the transition coordinate set;
    using the height difference as a transition vertical coordinate in the transition coordinate set; and
    determining the second converted two-dimensional coordinate set from the millimeter-wave radar coordinate system to the laser radar coordinate system according to the following formula:

$$(x_{2i}, y_{2i}, z_2)^T = R \times (x_{1i}, y_{1i}, z_1)^T + t,$$

wherein $x_{2i}$ is the horizontal coordinate of the second converted two-dimensional coordinates at the $i^{th}$ position in the second converted two-dimensional coordinate set, $y_{2i}$ is the longitudinal coordinate of the second converted two-dimensional coordinates at the $i^{th}$ position in the second converted two-dimensional coordinate set, $z_2$ is the vertical coordinate of the second converted two-dimensional coordinates, $(x_{2i}, y_{2i}, z_2)$ is the second converted two-dimensional coordinates at the $i^{th}$ position, $(x_{2i}, y_{2i}, z_2)^T$ is a transpose of the second converted two-dimensional coordinates at the $i^{th}$ position, R is the initial turning angle difference, $x_{1i}$ is the transition horizontal coordinate at the $i^{th}$ position, $y_{1i}$ is the transition longitudinal coordinate at the $i^{th}$ position, $z_1$ is the transition vertical coordinate, $(x_{1i}, y_{1i}, z_1)$ is the transition coordinates at the $i^{th}$ position, $(x_{1i}, y_{1i}, z_1)^T$ is a transpose of the transition coordinates at the $i^{th}$ position, and t is the initial displacement difference.

18. The non-transitory computer storage medium according to claim 14, wherein the optimizing a deviation between the first two-dimensional data set and the second converted two-dimensional coordinate set by using an optimization algorithm comprises:
    determining the deviation between the first two-dimensional data set and the second converted two-dimensional coordinate set according to the following formula:

$$\sigma^2 = \sum_{i=1}^{n} [(x_{ri}^2 - x_{2i}^2) + (y_{ri}^2 - y_{2i}^2) + z_2^2],$$

wherein $\sigma^2$ is the deviation, i is a natural number, n is a number of the plurality of preset positions, $x_{ri}$ is a horizontal coordinate of first two-dimensional coordinates at the $i^{th}$ position that are detected by the millimeter-wave radar, $y_{ri}$ is a longitudinal coordinate of the first two-dimensional coordinates at the $i^{th}$ position that are detected by the millimeter-wave radar, $x_{2i}$ is the horizontal coordinate of the second converted two-dimensional coordinates at the $i^{th}$ position in the second converted two-dimensional coordinate set, $y_{2i}$ is the longitudinal coordinate of the second converted two-dimensional coordinates at the $i^{th}$ position in the second converted two-dimensional coordinate set, and $z_2$ is the vertical coordinate of the second converted two-dimensional coordinates; and
    optimizing the deviation by using the optimization algorithm, and determining the calibrated turning angle difference, the calibrated displacement difference, and the calibrated vertical coordinate.

* * * * *